July 9, 1935.  J. C. CONN  2,007,561
CHAIN
Filed Sept. 15, 1933
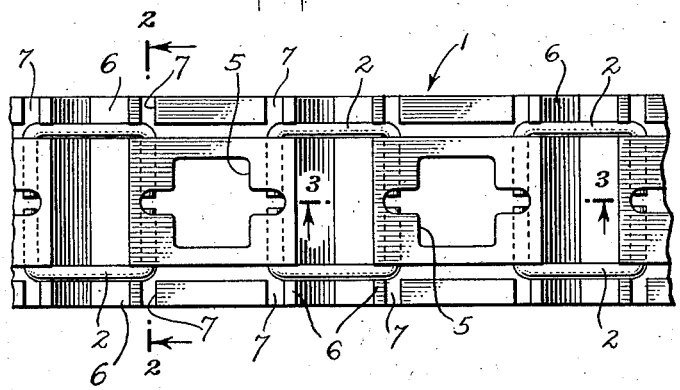
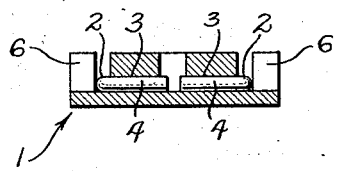
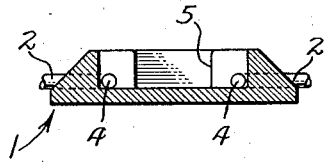
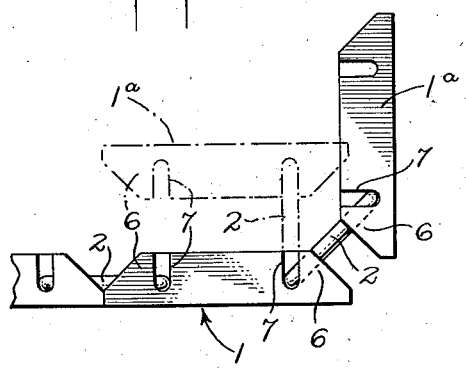
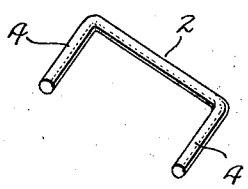
INVENTOR
Joseph C. Conn
BY
his ATTORNEYS Patented July 9, 1935

2,007,561

UNITED STATES PATENT OFFICE 2,007,561

CHAIN

Joseph C. Conn, Boonton, N. J.

Application September 15, 1933, Serial No. 689,587

7 Claims. (Cl. 74—249)

The present invention relates to an improvement in chains, one object thereof being to provide a composite chain structure the units or sections of which may readily be assembled by means of suitably formed connecting links and as easily disconnected. A further object has been to provide a chain in which connection is made between adjacent body links by means of a connecting link only when the parts are related in a manner not usual under normal conditions of operation, and wherein, when the chain is in working position or operating normally, the links cannot be disconnected accidentally.

It is appreciated that a chain having the foregoing attributes may be embodied in many different forms, one of which is illustrated in the drawing accompanying the present specification and in which—

Figure 1 is a plan view of the underside;

Figure 2, a transverse section on the line 2—2 of Figure 1;

Figure 3, a central longitudinal section on the line 3—3 of Figure 1;

Figure 4, a side view, and

Figure 5, a view in perspective of a connecting link.

Referring to the drawing, a chain according to my invention includes sections or body links indicated generally at 1, and connecting link members 2. The body link 1, as shown more clearly in Figure 2, is provided with pintle receiving recesses 3 having laterally exposed end openings adapted to receive end portions 4 of the U-shaped connecting link 2 which form the pintles or pivot pins of the chain, it being understood that said recesses are arranged adjacent to opposite ends of the body links 1 so that the end portions or pintles 4 of the connecting links 2 may engage pintle receiving recesses at one end of one body link and similar recesses at an end of the next adjoining body link when the parts are assembled.

The body link 1, in the specific form shown in the drawing, is provided with a central or body portion adapted to engage a driving or driven member. Thus, if the driving or driven member is equipped with teeth, as a sprocket for example, the body link 1 has a central recess 5 into which said teeth may fit. Any other suitable or usual interconnecting arrangement between the chain and a driving or driven member is contemplated.

Adjacent to each end of each body link and transversely spaced from the plane of each recess opening is a lug 6 positioned to retain the pintle of the connecting link 2 in operative relation to the pintle receiving recesses 3 at all operative or working positions of the chain, by which is meant, all operative angular relations between adjoining body links. In one operative position, as shown in Figure 4, the body link 1a may be positioned at an angle of 90° to the body link 1. In fact, body link 1 and connecting link 2 are prevented from coming apart by the lugs 6 in practically any angular relation between body link 1 and body link 1a except that of substantial parallelism, or as shown in dotted lines. With the parts in this relation, connection between body link 1 and body link 1a is effected by sliding the projecting ends or pintles 4 of the connecting links 2 inwardly past the inner faces of the retaining lugs 6, as through the slots 7. As soon as the pintles of any opposed pair of connecting links 2 have been moved inwardly past the lugs 6, said links are deflected forwardly to their connecting position behind lugs 6 which thereafter retain said connecting links in operative position as above described and as shown in the drawing. For removing a body link or for taking the chain apart, the connecting links between two body links are withdrawn or moved outwardly while the body links are in the parallel position as shown in Figure 4.

From the foregoing description and the stated mode of operation, it will be apparent that my improved chain structure presents a device which may be embodied in a wide variety of forms and may easily be assembled and taken apart practically without the use of tools. Obviously, this feature is important when replacing one or more broken parts, and affords material economies where endless chains or the like are to be taken apart or assembled on the job. Furthermore, in endless chains where sufficient slack is available no specially designed or constructed end or connecting members are needed. Other advantages and beneficial attributes will be apparent from a reading of the specification taken in connection with the appended drawing.

I claim:

1. A chain structure comprising a body link having transversely extending recesses each presenting a laterally exposed and accessible opening adjacent to each end of the link, and a link connector provided with a projecting pintle at each end for pivotally engaging one of said recesses, said body link being also provided with a lug arranged in longitudinally offset relation to each of said openings and spaced outwardly from the plane thereof in position to engage outwardly disposed portions of said connectors to retain said pintles in recess engaging relation in all usual operating positions of the chain and to permit withdrawal of said pintle laterally from said recess only when the link and connector are arranged in predetermined and normally inoperative relation.

2. A chain structure according to claim 1 and wherein the connector is U shaped and the free ends thereof constitute the pintles which pivotally engage said recesses.

3. A chain structure comprising a plurality of body links connected in end to end relation, each link being provided with two sets of co-axial laterally exposed openings and with lugs positioned at the lateral edges of the links in offset relation to said openings and between the axes of each set of said openings and an end of the link, said lugs being laterally spaced from the planes of said openings to present inwardly directed surfaces, and link connectors each comprising a single intermediate portion and parallel end pintles arranged at right angles thereto, the pintles being pivotally engaged in said openings and the intermediate portions extending across said inwardly directed lug surfaces and spanning the ends of adjacent links.

4. A chain structure comprising a plurality of body links connected in end to end relation, each link having lugs at end portions of its lateral edges and a centrally disposed bearing portion separated therefrom by longitudinally extending slots, said bearing portion being provided with laterally exposed openings in longitudinally offset relation to said lugs, and removable link connectors each comprising a single intermediate portion and parallel end pintles at right angles thereto, said connectors being slidable transversely past said lugs to bring the pintles into pivotal engagement with said openings, and deflectable into said longitudinally extending slots behind said lugs to retain said pintles in said pivotal engagement.

5. A chain structure comprising a plurality of body links arranged in end to end relation and connectors therebetween, each connector having a pintle at each end, and each body link having openings adjacent each end and exposed at its opposite sides to receive said pintles, and lugs positioned between the axes of said openings and each end of each body link and laterally spaced from the planes of said openings to present inwardly directed surfaces for engagement with said connecting members to retain said members against lateral displacement from their effective link connecting position.

6. A chain structure comprising a plurality of links connected in end to end relation, each link having laterally disposed edge portions and an intermediate bearing portion separated therefrom by parallel longitudinal grooves and provided with transverse recesses having laterally exposed openings, said edge portions being interrupted between their ends and opposite the respective openings of said transverse recesses to afford free lateral access thereto.

7. A chain structure according to claim 6 including removable link connectors each having a single intermediate portion and parallel end pintles disposed at right angles thereto, said pintles pivotally engaging said openings and said single intermediate portions extending along said grooves between said bearing portion and said edge portions.

JOSEPH C. CONN.